United States Patent [19]

Asami et al.

[11] Patent Number: 4,851,376

[45] Date of Patent: Jul. 25, 1989

[54] CORDIERITE CERAMIC BODY HAVING LOW THERMAL EXPANSION COEFFICIENT, PROCESS FOR PRODUCING THE SAME, AND METHOD OF EVALUATING CORDIERITE COMPOSITION

[75] Inventors: Seiichi Asami, Okazaki; Toshiyuki Hamanaka, Suzuka, both of Japan

[73] Assignee: NGK Insulators, Ltd., Nagoya, Japan

[21] Appl. No.: 22,134

[22] Filed: Mar. 5, 1987

[30] Foreign Application Priority Data

Mar. 8, 1986 [JP] Japan .................................. 61-50934
Mar. 8, 1986 [JP] Japan .................................. 61-50935

[51] Int. Cl.$^4$ ............................................ C04B 35/02
[52] U.S. Cl. .................................. 501/119; 250/252.1; 436/182; 264/66; 356/30
[58] Field of Search ...................... 436/4, 182; 501/119; 250/252.1 R, 306, 307, 252.1; 356/30; 264/66

[56] References Cited

U.S. PATENT DOCUMENTS

| | | |
|---|---|---|
| 3,885,977 | 5/1975 | Lachman et al. |
| 4,259,011 | 3/1981 | Crumm et al. ........................ 356/30 |
| 4,280,845 | 7/1981 | Matsuhisa et al. |
| 4,316,965 | 2/1982 | Oda et al. ............................ 501/119 |
| 4,434,117 | 2/1984 | Inoguchi et al. |
| 4,476,236 | 10/1984 | Inoguchi et al. ..................... 501/119 |
| 4,495,300 | 1/1985 | Sano ................................... 501/119 |
| 4,687,752 | 8/1987 | Peters ................................. 501/121 |
| 4,698,317 | 10/1987 | Inoue et al. ......................... 501/119 |

FOREIGN PATENT DOCUMENTS

| | | |
|---|---|---|
| 1518475 | 7/1978 | United Kingdom . |
| 2091239 | 7/1982 | United Kingdom . |
| 87/03963 | 7/1987 | World Int. Prop. O. ............ 356/30 |

OTHER PUBLICATIONS

Chemical Abstracts, vol. 92, No. 6, Feb. 1980, p. 267, 46224d.

Primary Examiner—William R. Dixon, Jr.
Assistant Examiner—A. Griffis
Attorney, Agent, or Firm—Arnold, White & Durkee

[57] ABSTRACT

A process for producing a cordierite ceramic body by using a reclaimed cordierite composition for a cordierite ceramic article which has a composition similar to that of the cordierite ceramic body. The process includes the steps of: forming a desired formed body under a pressure by using a starting material which includes the recovered reclaimed cordierite composition, or a mixture of the reclaimed cordierite composition and a fresh cordierite composition; firing the formed body at a temperature between 1280°–1330° C. into a sample of the cordierite ceramic body; measuring a reaction ratio (R) between the amount of protoenstatite and cordierite crystals present in the sample; and formulating the starting material so that the reaction ratio (R) is 0.3 or less.

26 Claims, 3 Drawing Sheets

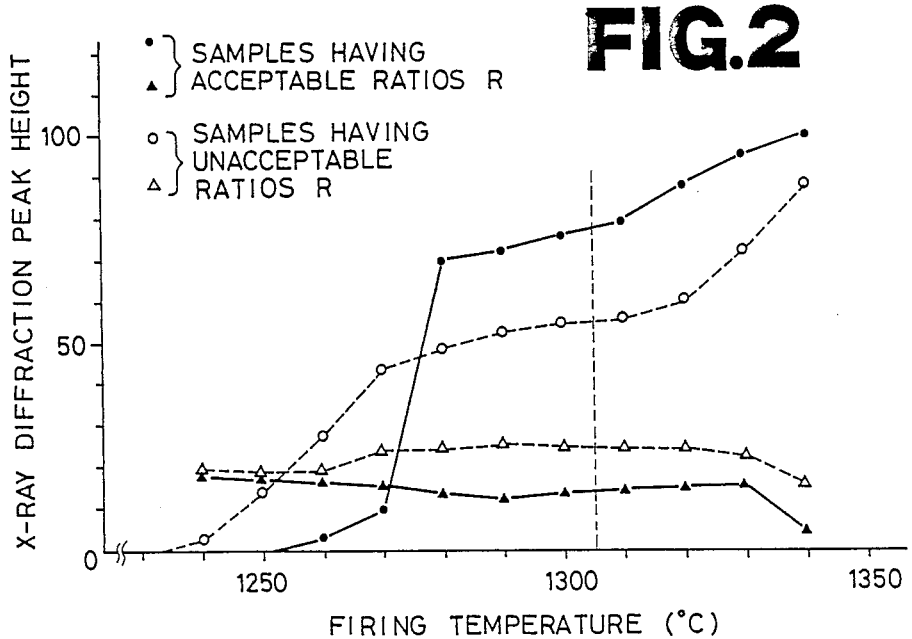
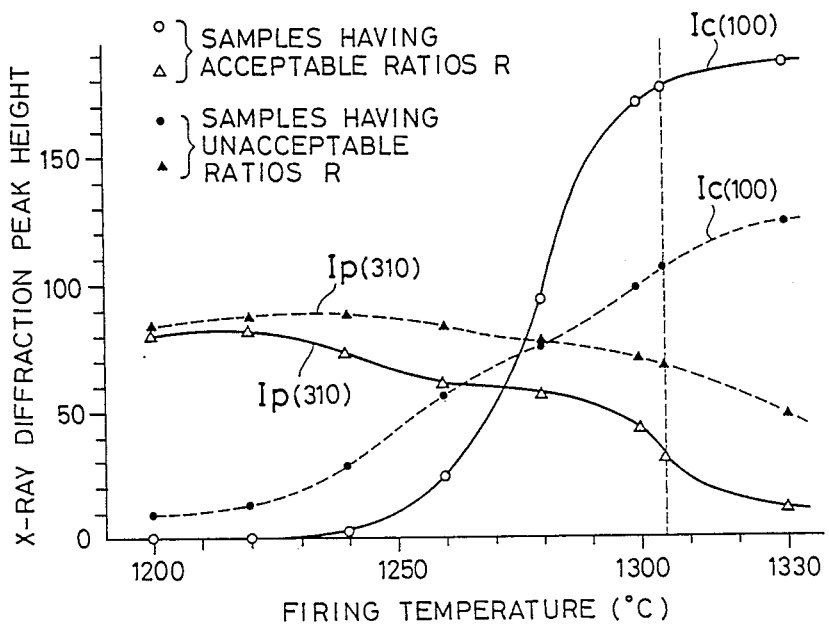

CORDIERITE CERAMIC BODY HAVING LOW THERMAL EXPANSION COEFFICIENT, PROCESS FOR PRODUCING THE SAME, AND METHOD OF EVALUATING CORDIERITE COMPOSITION

BACKGROUND OF THE INVENTION

1. Field of the Invention

The present invention relates generally to a cordierite ceramic body, and a process for producing the same, and more particularly to a process for stable or consistent fabrication of a cordierite ceramic article having a low coefficient of thermal expansion, in particular, a ceramic honeycomb structure suitably used as a device for purifying exhaust gases emitted by automotive vehicle engines. The invention is also concerned with a technique for evaluating cordierite compositions for such ceramic bodies, to check if the compositions are suitable for producing such a ceramic article that exhibits a low thermal expansion coefficient.

2. Discussion of the Related Art

There is known a cordierite ceramic article which is produced by firing a formed body of a cordierite batch composition which consists of a mixture including a magnesia source material, a silica source material and an alumina source material, for example, a mixture consisting of talc, kaolin and alumina. Such a cordierite ceramic article or product is known as having high thermal resistance to heat, and having a relatively low thermal expansion coefficient over a wide range of temperatures. For these properties, formed bodies of cordierite ceramics are particularly effectively used as honeycomb catalyst supports used in an apparatus or system for removing hydrocarbons, carbon monoxide, nitrogen oxides, etc., that are contained in various kinds of exhaust gases. Such honeycomb catalyst supports when used for purifying exhaust gases emitted by automobile engines, are subject to high thermal stresses. If the thermal expansion coefficient of the honeycomb structures is higher than $1.1 \times 10^{-6}/°$ C. (at 40°–800° C.), these structures are not able to withstand thermal stresses applied thereto during their service, and are likely to be damaged or broken. Therefore, it is required that their thermal expansion coefficient be less than $1.0 \times 10^{-6}/°$ C. (at 40°–800° C.: this temperature range being hereinafter applied to any thermal expansion coefficient values), preferably less than $0.8 \times 10^{-6}/°$ C.

To satisfy the above requirements, techniques for lowering the thermal expansion coefficient of cordierite ceramic articles have been proposed. For example, U.S. Pat. No. 3,885,977 (published in 1975) proposes a technique of crystal orientation of kaolin as one of components of a cordierite batch composition. Further, U.S. Pat. No. 4,280,845 (published in 1978) proposes a technique of maintaining the particle size of a magnesia source such as talc used as a component of a cordierite composition, within a specific range. There have been also disclosed techniques for reducing the thermal expansion coefficient of cordierite ceramic bodies by using suitable chemical composition of silica, alumina and magnesia, or by establishing suitable conditions in which the cordierite batch compositions are fired into the desired ceramic bodies.

Since a cordierite batch composition for a cordierite ceramic body or article is formed of a mixture consisting of various natural materials such as talc and kaolin, an adjustment of the proportions of the components or the particle size control for each production batch of the cordierite composition, is not effective enough to lower the thermal expansion coefficient of a ceramic article obtained from the thus adjusted or controlled cordierite batch composition. Namely, the obtained cordierite article may have an unexpectedly high coefficient of thermal expansion, depending upon the specific conditions in which the cordierite batch composition is prepared. Thus, it has been considerably difficult to achieve consistently stable fabrication of cordierite ceramic bodies or articles that have a sufficiently low coefficient of thermal expansion.

In the production of cordierite ceramic bodies, some portion of a batch of cordierite composition is rejected for some reason or other, before firing step. For economical production or reduced material cost of the cordierite ceramic products, these rejects in the form of a dried, unfired formed body or segments thereof, are reclaimed as a reclaimed cordierite composition for the same or other cordierite products. However, it is recognized that the cordierite ceramic bodies conventionally formed of such reclaimed cordierite compositions tend to have a comparatively large fluctuation in their coefficient of thermal expansion, and that such reclaimed cordierite compositions are hardly considered to be satisfactory starting materials for producing cordierite ceramic products having a low thermal expansion property. Consequently, the dried, unfired bodies of rejects of a cordierite composition are crushed into a powder form, and used as second-grade materials for fabricating cordierite products that are not required to have a low coefficient of thermal expansion. This fact indicates that a relatively high cost of materials in the production of first-grade cordierite ceramic bodies only have a satisfactorily low coefficient of thermal expansion.

As described above, the reclamation of unfired formed rejects of a cordierite material is considered difficult, particularly for producing a catalyst support structure for purifying automobile exhaust gases, which is required to have a thermal expansion coefficient not exceeding $1.0 \times 10^{-6}/°$ C. So far, there has been proposed no effective manner of adjusting such reclaimed cordierite materials, to assure stable production of cordierite ceramic bodies that exhibit a sufficiently low coefficient of thermal expansion.

SUMMARY OF THE INVENTION

It is therefore an object of the present invention to provide a process for producing a cordierite ceramic body having a low coefficient of thermal expansion, by means of reclaiming as a starting material or a portion of the starting material a dried, unfired reject of a cordierite composition, which is recovered during production of a cordierite ceramic article similar to the cordierite ceramic body.

Another object of the invention is to provide a comparatively inexpensive cordierite ceramic body which has a low coefficient of thermal expansion and which is wholly or partially made of a reclaimed cordierite composition, and to provide a process for economical and stable production of such a cordierite ceramic body.

It is a further object of the present invention to provide a method of evaluating a cordierite composition prior to a batch production of a cordierite ceramic product using such cordierite composition.

A still further object of the invention is to provide a method of accurately evaluating a thermal expansion coefficient of a cordierite ceramic body, by checking a sample prepared prior to a batch production of the ceramic body.

According to the present invention, there is a process for producing a cordierite ceramic body, by using a reclaimed cordierite composition for a cordierite ceramic article similar to the cordierite ceramic body, the process comprising the steps of: recovering the reclaimed cordierite composition in the form of a dried, unfired scrap which is rejected during production of the cordierite ceramic article; forming a desired formed body, by using a starting material which consists of the recovered reclaimed cordierite composition, or a mixture of the reclaimed cordierite composition and a fresh cordierite composition; firing the formed body into a fired sample of the cordierite ceramic body; formulating the starting material so that a reaction ratio R of the cordierite batch composition of the starting material, represented by the following equation, is 0.3 or less, $$R = Ip(310)/Ic(100),$$

where, $Ip(310)$ and $Ic(100)$ respectively represent peak intensities in x-ray diffraction analysis of a (310) face of a protoenstatite crystal and a (100) face of a cordierite crystal on a pressure surface of the sample, and where the sample is obtained by firing the formed body at a temperature between 1300° C. and 1310° C.; and starting a batch production of the cordierite ceramic body by using the formulated starting material.

The instant process is suitably used for producing a honeycomb structure. Such a honeycomb structure or other cordierite ceramic articles or bodies produced according to the instant process has a sufficiently low coefficient of thermal expansion, namely, as low as $1.0 \times 10^{-6}/°$ C. or less at 40°–800° C. In particular, the cordierite ceramic bodies produced according to the present process are advantageously used as ceramic honeycomb catalyst supports employed in various exhaust-gas purifying systems, especially, exhaust-gas purifiers for automotive vehicles.

The reclaimed cordierite composition used to fabricate the cordierite ceramic body according to the invention may be a dried, unfired scrap which is a rejected batch of a cordierite composition not used for producing the cordierite ceramic article, or a dried, unfired shaped body or its fregments which is/are rejected and recovered before the shaped body is fired into the cordierite ceramic article.

The cordierite starting material of which the desired formed body is made, may be formulated or adjusted by lightly smashing the dried, unfired scrap under a low impact pressure. Preferably, the smashing step consists of crushing the dried, unfired scrap into small pieces with a toothed roller crusher, and thereafter milling the pieces into fine particles with a low-speed pin mill. In one form of the instant process, water is added to the dried, unfired scrap of the cordierite composition, or to a mass of its fragments, so that the reclaimed cordierite composition is prepared in the form of a slurry or green batch. The cordierite reaction ratio R of the reclaimed cordierite composition thus formulated or prepared is 0.3 or less.

According to another advantageous feature of the instant process, the starting material of which the desired formed body for the cordierite ceramic body is formed contains the reclaimed cordierite composition in an amount ranging from 2.5% to 100% by weight.

According to a further advantageous feature of the present invention, the formed body is heated to a temperature between 1300° C. and 1310° C. at a rate of about 150° C.–350° C./hour, and immediately after the formed body is heated to the specified temperature, the formed body is rapidly cooled. Thus, the fired sample of the cordierite ceramic body is prepared. This sample is subjected to an x-ray diffraction analysis, to obtain the peak intensities $Ip(310)$ and $Ic(100)$ indicated above, in order to calculate the reaction ratio R.

BRIEF DESCRIPTION OF THE DRAWINGS

The above and other objects, features and advantages of the present invention will be better understood by reading the following description of preferred embodiments of the invention referring to specific Examples, when considered in connection with the accompanying drawings, in which:

FIG. 2 is a graph associated with Example 5, representing a relation between a firing temperature and an X-ray diffraction peak height;

FIG. 3 is a graph associated with Example 6, showing a relation similar to that of FIG. 2.

DETAILED DESCRIPTION OF THE INVENTION

Figure 1:
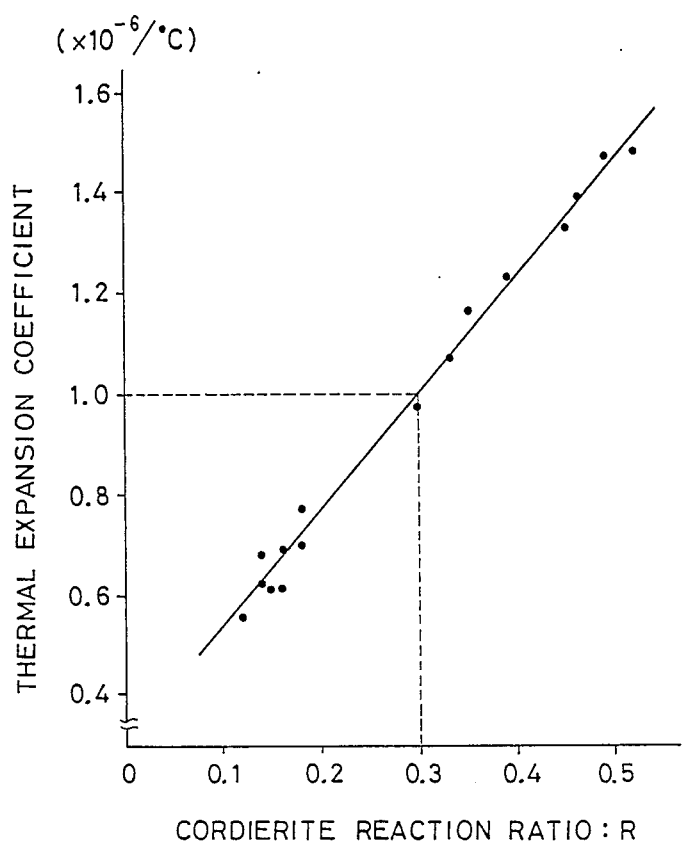
FIG. 1 is a graphical representation associated with Example 1, showing a relation between a reaction ratio R of a cordierite material and a thermal expansion coefficient of a cordierite ceramic body made of the material.

As indicated above, the reclaimed cordierite composition is a dried, unfired scrap which may be a portion of a cordierite composition batch consisting of a magnesia source, a silica source and an alumina source, that is rejected and recovered for some reason or other, during production of a cordierite ceramic article similar to the cordierite ceramic body to be produced according to the present process. This portion of the batch not used for the ceramic article is rejected before the batch is used for preparing an unfired shaped body for the cordierite ceramic article. Alternatively, the reclaimed cordierite composition used according to the invention may be a dried, unfired shaped body or a mass of their fragments, which has been dried, but not yet been subjected to a firing step. Thus, the dried, unfired scrap used as the reclaimed cordierite composition in the present process is a mixture having a chemical composition similar to a conventionally used cordierite composition, which contains talc, kaolin, calcined kaolin, alumina and other materials.

The starting material used to prepare an unfired formed body for the desired cordierite ceramic body may consist solely of the reclaimed cordierite composition, or alternatively of a mixture of the reclaimed cordierite composition and a fresh cordierite composition exclusively prepared for addition to the reclaimed cordierite composition. According to the principle of the present invention, the cordierite reaction ratio R of the thus prepared starting material is obtained to check if the starting material is suitable for obtaining the desired cordierite ceramic body.

Studies and investigations by the present inventors revealed that the coefficient of thermal expansion of a cordierite composition, which is the most important property of a cordierite ceramic body, is closely associated with a cordierite reaction process, more specifically, associated with a process in which the cordierite is crystallized at a temperature between 1200° C. and 1350° C. Described in greater detail, it was found that under certain conditions in which the reclaimed cordierite composition is formulated or prepared, crystallization of a cordierite starts at an extremely low temperature below 1250° C., restraining a primary liquid phase crystallization of the cordierite at a high temperature above 1270° C. As a result, the firing of the formed body of the cordierite composition will not result in a cordierite ceramic body having a sufficiently low thermal expansion coefficient, even if the formed body is held at the maximum firing temperature for a sufficient period of time. That is, even when the particle size and other apparent physical properties of one reclaimed cordierite composition is completely the same as those of another reclaimed cordierite composition, the coefficients of thermal expansion of the obtained cordierite ceramic bodies differ, depending upon the conditions in which those reclaimed cordierite compositions are formulated or processed.

In view of the above, an amount of crystallized protoenstatite which is an intermediate product produced during firing of the unfired formed body, and an amount of crystallized cordierite, are obtained by subjecting the sample of the fired formed body to an x-ray diffraction analysis. By checking these amounts of crystallized protoenstatite and cordierite relative to each other, i.e., by checking the cordierite reaction ratio R of the sample prior to a batch production of the desired cordierite ceramic body, it is possible to estimate the thermal expansion coefficient of the cordierite ceramic body which is produced on a commercial basis by firing the corresponding unfired formed body at an ordinary firing temperature (1350° C. through 1440° C.). The present quantitative analysis of the thermal expansion coefficient has made it possible to use various reclaimed cordierite materials for producing cordierite honeycomb structures for automobile exhaust-gas purifying equipment, that must be sufficiently low in thermal expansion coefficient. Conventionally, it has been impossible to determine whether such reclaimed cordierite materials may be used for honeycomb structures for such applications, since the thermal expansion coefficient of a product obtained from the reclaimed materials cannot be determined from the particle size, appearance, chemical composition or other factors of the reclaimed materials.

To check the cordierite reaction ratio R of the starting material containing a reclaimed cordierite composition, a sample of a suitable size of the desired cordierite ceramic body is prepared. Initially, a formed body of the sample is prepared from the starting material, by a pressure-forming method such as extrusion or press molding. In the case where the unfired body is formed by press molding, cares must be taken not to apply an excessive pressure, since the particles of the starting material may be damaged under such an excessive pressure, resulting in changing the reaction behavior. In this connection, it is desired that the volumetric density of the formed body is less than 1.8 g/cm$^3$. Further, to avoid cracking or other damages of the sample upon rapid cooling of the fired formed body, the sample (unfired formed body for the sample) must be relatively small, preferably, having a cross sectional area of about 30mm×30mm. The unfired formed body of the sample is then heated in a furnace to a temperature between 1300° C. and 1310° C., at a rate ranging from 150° C./hour to 350° C./hour. For improved accuracy of the obtained data on the reaction ratios R for samples of different cordierite ceramic bodies, it is preferred to maintain the heating rate within a range between 200° C./hour and 300° C./hour. For easier heating, the use of a relatively small electric furnace is recommended. Cares must be exercised so that the furnace has a uniform temperature distribution.

Although the investigation of the reaction ratio R of the fired sample is possible with the firing temperature within a range of 1280°–1330° C., it is preferred that the firing temperature be held within a narrower range of 1300°–1310° C., for increased consistency and accuracy of the data R. More preferably, the unfired formed body of the sample is heated to 1305° C., and the thus fired sample is tested in its cordierite reaction ratio R.

The thus prepared sample is then rapidly cooled, before it is subjected to an x-ray diffraction analysis. The cooling is generally effected in air after the fired sample is removed out of the firing furnace. For this removal, the use of an electric furnace is desirable. However, if the furnace used does not permit easy removal of the fired sample, the sample may be rapidly cooled within the furnace. Usually, the sample is cooled at a rate of at least 300° C./hour, preferably 500° C./hour or higher.

The thus obtained sample is subjected to an x-ray diffraction analysis, to measure diffraction peak values Ip(310) and Ic(100) of protoenstatite and cordierite at a pressure surface of the sample. For example, if the sample is an extruded honeycomb structure, the measurements are taken on a surface of a wall of the honeycomb structure. If the sample is a pressed-molded body, the measurements are taken on a surface which is perpendicular to the direction in which a pressure is applied during the pressure molding. For instance, where a Cu—Kα target is used, the peak heights of x-ray diffraction are measured on a (310) face of the protoenstatite crystal at $2\theta=30.8°$, and on a (100) face of the cordierite crystal parallel its C axis, at $2\theta=10.3°$. These peak heights are taken as the peak intensities. The peak heights may be replaced by peak areas, or counts obtained on an x-ray detector for the x-ray diffraction analysis.

It is known that the cordierite crystals are orientated with their C axes perpendicular to the C axes of talc and kaolinite crystals. Where a honeycomb structure is formed of a cordierite composition, the structure exhibits a sufficiently low coefficient of thermal expansion only if the cordierite crystals are suitably orientated. In the case of the sample discussed above, the orientation of the talc and kaolinite crystals causes the (100) faces of the cordierite crystals to have a greater x-ray diffraction intensity. For example, if the orientation of the cordierite crystals is abnormal due to an inadequate shape of the kaolin material, the x-ray diffraction intensity of the (100) face of the cordierite crystals is lowered, whereby the cordierite reaction ratio R=Ip(310)/Ic(100) of the sample is increased.

The process of the present invention was developed based on a finding that the cordierite reaction ratio R has a close relationship with the thermal expansion coefficient of a fired cordierite ceramic body which is obtained by an ordinary firing process. The instant process requires formulating the starting material, if the cordierite reaction ratio R of a sample fired at a temperature of 1300°–1310° C. is 0.3 or less. Thus, the instant process is effective for producing a cordierite ceramic body with a thermal expansion coefficient of $1.0 \times 10^{-6}/°$ C. or lower at a temperature of 40°–800° C. It is noted that the cordierite reaction ratio R is slightly varied as the firing temperature of the sample (final level from which the sample is cooled) is changed. More specifically, the value R is slightly increased if the firing temperature is 1280° C., and the ratio R is slightly decreased if the firing temperature is 1330° C. At any rate, the ratio R must be 0.3 or less, when the sample is obtained by firing at a temperature between 1300° C. and 1310° C.

If the cordierite reaction ratio R of the sample is greater than 0.3, the starting material for a cordierite ceramic body must be formulated so that the cordierite reaction ratio R of the sample obtained from the starting material is 0.3 or less. In the case where the reaction ratio R of the reclaimed cordierite composition of the starting material is larger than 0.3, a fresh cordierite material (a mixture of magnesia, silica and alumina sources such as talc, kaolin and alumina) may be added to the reclaimed cordierite material. However, the addition of such a fresh cordierite material to the reclaimed cordierite material to prepare a new starting material may not reduce the thermal expansion coefficient of the obtained cordierite ceramic body. In this case, therefore, the reaction ratio R of the reclaimed cordierite material, or the reaction ratio R of the newly prepared starting material as a whole, must be 0.3 or less. Of course, the reaction ratio R must not exceed 0.3 where the starting material consists solely of the reclaimed cordierite composition. In the case where the starting material consists of a reclaimed cordierite composition and a fresh cordierite composition, it is desirable that the reaction ratio R of the starting material as a whole be 0.3 or less, even if the reaction ratio R of the reclaimed material is 0.3 or less.

The use of the reclaimed cordierite composition having a reaction ratio R of 0.3 or lower, permits a significant reduction in the material cost of a cordierite ceramic body, and contributes to reducing a variation in the quality of a newly prepared cordierite material which contains natural materials (such as talc and kaolin), thereby improving the consistency of the cordierite batch composition and the formability of the cordierite material, which leads to improved consistency in the quality of a desired cordierite ceramic product.

The reclaimed cordierite composition used according to the invention is recovered in the form of a dried, unfired scrap or reject, which may be a rejected portion of an unfired shaped body or its fragments, or may be a rejected portion of a batch of a cordierite composition for a given article. Such dried, unfired scrap contains an organic binder such as methylcellulose, PVA, CMC, starch paste, or glycerine. The particles of the dried scrap are tightly bonded together by the binder. Although it is desirable that the reclaimed cordierite material be divided into the individual particles, the separation of the bonded particles is extremely difficult. The situation is the same where the recovered dried scrap contains a clay material having a bonding property, instead of an organic binder. Further, it is noted that the particles of an ordinary cordierite material such as talc and kaolin are comparatively soft and are easily damaged by mechanical impacts, being vulnerable to micro cracks. In addition, the particles easily undergo mechanochemical changes in their crystal structure. Such damages or physical changes of the reclaimed cordierite material will cause a reactional behavior which is completely different from that of the original batch.

Accordingly, the reclaimed or recovered cordierite composition in the form of a dried, unfired shaped body or its fragments must be formulated or processed carefully, so that the formulated reclaimed cordierite composition exhibits a reactional behavior similar to that of a fresh cordierite material. According to the present invention, the reclaimed cordierite material is processed by lightly smashing the unfired scrap under a relatively small impact.

Described more specifically, where the recovered scrap is an unfired shaped body, for example, a honeycomb structure, or its fragments, the scrap is first subjected to a rough-crushing process wherein the scrap is crushed into small pieces having an average diameter of about 50 mm. Then, the pieces are subjected to a fine-milling process depending upon the form of the scrap. The rough-crushing is preferably carried out by a toothed roll crusher, a corrugated roll crusher, a jaw crusher, or other types of crushers that do not exert an excessive force on the scrap. In particular, a crushing operation by the toothed roll crusher is recommended. The fine-milling operation is advantageously accomplished by a pin mill (impact mill). The thermal expansion coefficient of a product to be obtained is closely associated with the number of pins, and the peripheral speed of the mill, and with the amount of the reclaimed cordierite material to be milled. These operating parameters of the mill must be carefully selected so that the cordierite reaction ratio R of the processed reclaimed cordierite composition is below the specified level. Generally, the use of a low-speed impact mill rather than a high-speed impact mill is preferred, for reducing milling impacts given to the material. Even in this case, large milling impacts are given to the material if the mass of the material loaded to the mill is extremely small relative to the milling capacity of the mill. Therefore, the load of the mill, and other milling conditions must be determined so as to minimize the milling impacts to the material. The thermal expansion coefficient of the product obtained from the processed material is increased with a magnitude of the milling impacts that have been applied to the material.

One method for processing the reclaimed cordierite composition without applying mechanical impacts to the material, consists in adding water to a dried, unfired shaped scrap or its fragments, so that the scrap is available in the form of a slurry or green batch. This method allows the scrap to be easily and effectively divided into the particles, without giving mechanical impacts to the particles. The method is useful for processing the reclaimed material to give a cordierite reaction ratio R not exceeding 0.3.

The thus formulated or processed reclaimed cordierite material is sieved or screened, as needed, depending upon the product to be made, by a suitable classifying apparatus such as a vibrating screen or an air elutriation classifier ("Microplex").

The processed reclaimed cordierite composition is used alone as a starting material for producing a cordierite ceramic body according to the present invention. Alternatively, the reclaimed cordierite composition is mixed with a fresh mass of a cordierite composition, and the mixture is used as the starting material. As previously described, the cordierite reaction ratio R of the starting material must not exceed 0.3, in either of the above two cases. Generally, the starting material may include the reclaimed cordierite composition in an amount ranging from 2.5% to 100% by weight.

The proportions of silica, alumina and magnesia of the starting material are suitably controlled, to provide a chemical composition similar to that of a known cordierite ceramic product. For example, the starting material contains 42-56% by weight of silica, 30-44% by weight of alumina, and 10-18% by weight of magnesia. Preferably, the starting material contains 44-53% by weight of silica, 32-41% by weight of alumina, and 12-16% by weight of magnesia. The thus prepared starting material is formed into a desired shape and fired into the intended cordierite ceramic body, according to the suitable known methods. For instance, the starting material is plasticized with a suitable aid, and the plasticized batch is used to prepare a desired formed body, by an extrusion, press, forming rolls, or other suitable equipment and methods known in the art. The prepared formed body is dried, and the dried body is heated to a temperature between 1350° C. and 1440° C. The rate of rise of the firing temperature up to 1100° C. must not exceed 250° C./hour. Above 1100° C., the firing temperature must be raised at a rate between 30° C./hour and 300° C./hour. The formed body is kept at the firing temperature (1350°-1440° C.) for about 0.5-24 hours. Thus, a desired end product, that is, a cordierite ceramic body having a low coefficient of thermal expansion is produced.

Since the cordierite reaction ratio R of the starting material is held not more than 0.3, the obtained cordierite ceramic body has a satisfactory thermal expansion property, that is, a thermal expansion coefficient not exceeding $1.0 \times 10^{-6}/°$ C.

In particular, the cordierite ceramic body characterized by a low thermal expansion coefficient is suitably used as a honeycomb structure for various exhaust-gas purifying devices, especially as honeycomb catalyst supports for purifying exhaust gases emitted by automotive vehicle engines.

It will be understood from the foregoing explanation that the present invention has made it possible to use reclaimed cordierite materials for producing low-expansion cordierite ceramic articles, which has been considered difficult. Accordingly, the process according to the invention provides a significant improvement in the yield of the cordierite material, and permits a considerable reduction in the cost of manufacture of cordierite ceramic articles such as honeycomb catalyst supports for automobile exhaust-gas purifying equipment.

In addition to the reduced cost of manufacture of the cordierite ceramic products, the processing of the reclaimed cordierite material so as to provide a cordierite reaction ratio R of 0.3 or lower is effective to assure a stable control of the thermal expansion property of the products, namely, effective to reduce an otherwise large variation in the thermal expansion property of a fresh cordierite composition which contains natural minerals such as talc and kaolin.

Further, since the reclaimed cordierite composition is suitably processed or formulated, the formability of the starting material is improved. This is particularly so, when the reclaimed cordierite material is used for producing a large-sized product.

DETAILED DESCRIPTION OF THE PREFERRED EMBODIMENTS

To further clarify the principle of the present invention, several specific examples of the invention will be described, for illustrative purpose only. It is to be understood that the invention is not limited to these illustrated examples, and that the invention may be embodied with various changes and modifications which may occur to those skilled in the art, in the light of the foregoing detailed description and the illustrated examples, without departing from the spirit of the present invention.

EXAMPLE 1

Dried, unfired cordierite honeycomb bodies were used as a reclaimed scrap. Each honeycomb body has a diameter of 102 mm, a height of 89 mm, and a wall thickness of 150 microns, and has about 62 cells per square centimeter. The reclaimed scrap consists of 100 parts by weight of a cordierite composition, and 3 parts by weight of methylcellulose as an organic binder. The proportions of the components of the cordierite composition are as shown in Table 1, and the chemically analyzed values of the cordierite composition are indicated in Table 2. The reclaimed honeycomb bodies were crushed and milled or ground by different methods and under different conditions as indicated in Tables 3 and 4. Thus, various processed reclaimed cordierite compositions were prepared.

TABLE 1

| Materials | Talc | Kaolin + Calcined Kaolin | Alumina |
|---|---|---|---|
| Batch Composition (wt. %) | 39.1 | 47.4 | 13.5 |

TABLE 2

Chemical Composition of Raw Materials (wt. %)

| | Ig. loss | $SiO_2$ | $Al_2O_3$ | MgO | $Fe_2O_3$ | $TiO_2$ | $K_2O$ + $Na_2O$ + CaO |
|---|---|---|---|---|---|---|---|
| Talc | 5.6 | 61.8 | 0.2 | 31.7 | 0.1 | — | 0.3 |
| Kaolin | 13.9 | 45.3 | 38.6 | — | 0.4 | 1.2 | 0.3 |
| Calcined Kaolin | 0.2 | 52.6 | 44.9 | — | 0.4 | 1.4 | 0.3 |
| Alumina | 0.1 | — | 99.3 | — | — | — | 0.3 |

TABLE 3

| Specimen Nos. | Original *2 | 1 | 2 | 3 | 4 | 5 | 6 | 7 |
|---|---|---|---|---|---|---|---|---|
| Rough-Crushing (Max. Piece Size: 20 mm) | — | Toothed Roll Crusher | Corrugated Roll Crusher | Jaw Crusher | Impact Crusher | Ball Mill | Jet Mill | Toothed Roll Crusher |
| Fine-Milling (in Dry State) | — | Low-Speed Pin Mill | | | | | | |
| | | Load: 95% of Nominal Capacity | | | | | | Load: 80% of Nominal Capacity |
| Particle Size of Processed Material (APS μm)*1 | — | 7.0 | 6.4 | 5.1 | 6.2 | 5.4 | 7.1 | 5.5 |

TABLE 3-continued

| Specimen Nos. | Original *2 | 1 | 2 | 3 | 4 | 5 | 6 | 7 |
|---|---|---|---|---|---|---|---|---|
| Reaction Ratio R | 0.12 | 0.16 | 0.14 | 0.18 | 0.45 | 0.49 | 0.33 | 0.16 |
| Coefficient of Thermal Expansion ($\times 10^{-6}/°$C. 40-800° C.) | 0.56 | 0.70 | 0.69 | 0.78 | 1.33 | 1.47 | 1.08 | 0.62 |

*1 ... Measured in x-ray sedimentation process (by "Sedi-Graph" available from Micro Meritix)
*2 ... Honeycomb structure (obtained from the non-processed reclaimed material, and used for reclaimed materials)

TABLE 4

| Specimen Nos. | 8 | 9 | 10 | 11 | 12 | 13 | 14 | 15 |
|---|---|---|---|---|---|---|---|---|
| Rogh-Crushing (Max. Piece Size: 20 mm) | Toothed Roll Crusher | | | | | | | |
| Fine-Milling (in Dry State) | Low-Speed Pin Mill | | | High-Speed Pin Mill | Impact Crusher | Low-Speed Pin Mill | | Ball Mill |
| | Load: 65% of Nominal Capacity | Load: 40% of Nominal Capacity | Load: 20% of Nominal Capacity | (Peripheral Speed: 120 m/sec.) | (Peripheral Speed: 130 m/sec.) | Load: 80% of Nominal Capacity | | |
| Particle Size of Processed Material (APS μm)*1 | 5.0 | 4.8 | 3.8 | 3.0 | 6.4 | 5.5 | 5.7 | 6.2 |
| Reaction Ratio R | 0.18 | 0.30 | 0.39 | 0.35 | 0.52 | 0.14 | 0.15 | 0.47 |
| Coefficient of Thermal Expansion ($\times 10^{-6}/°$C. 40-800° C.) | 0.71 | 0.98 | 1.24 | 1.17 | 1.49 | 0.63 | 0.62 | 1.39 |

Then, 3 parts by weight of methylcellulose and a suitable amount of water were added to 100 parts by weight of each batch of the thus processed reclaimed cordierite compositions prepared as indicated above. After the mixture was kneaded, each prepared mixture batch was formed into a honeycomb structure, according to a known extrusion technique. Each honeycomb structure has a diameter of 80 mm, a height of 76 mm, and a wall thickness of 150 microns. The structure has about 62 cells per square centimeter. The honeycomb structure made of the reclaimed cordierite materials were then fired at 1400° C. for 8 hours, whereby various evaluation samples were prepared. The cordierite reaction ratio R and the thermal expansion coefficient of each sample were measured. The measurements are listed in Tables 3 and 4.

Before the unfired honeycomb structures were formed, the processed reclaimed cordierite materials were passed through a 105-micron shieve. The cordierite reaction ratio R was measured after the unfired honeycomb structures were heated to 1305° C. in an electric furnace at a rate of 300° C./hour, and rapidly cooled from 1305° C. in air outside the furnace. The measurements were effected by means of a known x-ray diffraction analysis on surfaces of the honeycomb wall that are parallel to the direction in which the honeycomb structures were extruded. The wall surfaces to be measured were ground, and were irradiated with x-rays, at $2\theta = 30.8°$ to measure a peak height Ip(310) on the (310) face of protoenstatite crystals, and at $2\theta = 10.3°$ to measure a peak height Ic(100) on the (100) face of cordierite crystals. The reaction R=Ip(310)/Ic(100) was calculated.

Referring to FIG. 1, there is shown a relationship between the measured reaction ratios R and the measured expansion coefficients of the fired honeycomb structures (fired at 1400° C. for 8 hours). It is noted that the samples whose thermal expansion coefficient was measured were different from the samples whose cordierite reaction R was measured.

As is apparent from Tables 3 and 4, the cordierite reaction ratio R can be made relatively low, by crushing and milling the unfired honeycomb scraps in a manner that prevents the materials from being subjected to excessive mechanical impacts. For example, the cordierite reaction ratio R of the processed reclaimed cordierite composition was comparatively low, where the rough-crushing operation was effected by a toothed or corrugated roller crusher or a jaw crusher, while the fine-milling operation was effected by a low-speed pin mill.

As shown in the graph of FIG. 1, there exists a distinct linearly proportional relation between the cordierite reaction ratio R and the thermal expansion coefficient of the samples (which were fired in an ordinary manner, i.e., 1400° C.×8 hours). The graph indicates that the thermal expansion coefficient is less than $1.0 \times 10^{-6}/°$ C. if the cordierite reaction ratio R is less than about 0.3.

EXAMPLE 2

The same processed reclaimed cordierite compositions as used in Example 1 were wetted and swollen with water. An additional amount of water was added to each batch of the reclaimed cordierite composition, and was kneaded in a kneader, whereby a homogeneous green batch of the cordierite composition was prepared. The paste was passed through a 150-micron slit screen shieve, to remove the particles having sizes exceeding 150 microns. The paste was then extruded into honeycomb structures, each of which has a diameter of 80 mm, a height of 78 mm and a wall thickness of 150 microns, and has about 62 cells/square centimeter.

Each honeycomb structure was fired into a sample, whose cordierite reaction ratio R and thermal expansion coefficient were measured in the same manner as used in Example 1. The measurements are indicated in Table 5.

TABLE 5

|  | Original Honeycomb Structure | Example 2 |
|---|---|---|
| Reaction Ratio R (Sample heated to 1305° C.) | 0.12 | 0.14 |
| Coefficient of Thermal Expansion ($\times 10^{-6}$/°C. 40–800° C.; Sample fired at 1400° C. for 8 hours) | 0.56 | 0.69 |

In Example 2, the reclaimed cordierite compositions were processed simply by adding water to the unfired honeycomb scrap, and the materials were substantially free from mechanical impacts. Table 5 reveals that the reaction ratio R and the thermal expansion coefficient of the samples obtained in Example 2 are very close to those of the original honeycomb structure obtained from the non-processed scrap.

EXAMPLE 3

The processed reclaimed cordierite compositions, specimen Nos. 1 and 4 used in Example 1, were mixed with a batch of a fresh cordierite composition which contains talc, kaolin, calcined kaolin and alumina in proportions as indicated in Table 1. The proportions of the reclaimed cordierite composition and the fresh cordierite composition are indicated in Table 6. 3.5 parts by weight of methylcellulose and a suitable amount of water were added to each of the specimens, and each mixture was uniformly kneaded in a kneader, whereby a green batch of each specimen mixture was obtained. With this green body, honeycomb structures were extruded and fired as in the preceding examples. Each structure is 80 mm in diameter and 76 mm in height, and has a wall thickness of 150 microns, and about 62 cells per square centimeter.

The cordierite reaction ratio R (at 1305° C.) and the thermal expansion coefficient (1400° C. $\times$ 8 hours) were measured, in the same manner as in Example 1. The measurements are listed in Table 6.

Table 6 shows that the thermal expansion coefficient of the fired samples is sufficiently low where the reaction ratio R of the processed reclaimed material is below 0.3 (where the reclaimed material of Specimen No. 1 of Example 1 was used). Table 6 also shows that only a very small proportion of the reclaimed material can be used, where the reaction ratio R of the reclaimed material as processed is considerably higher than 0.3 (where the reclaimed material of Specimen No. 4 was used).

Example 4

A batch of 5 g of each of the specimen Nos. 1–5 of Example 1 was formed into a pellet of $5 \times 15 \times 20$ mm dimensions, according to an ordinary press molding method under a pressure of 300 kg/cm$^2$. Each pellet was heated to 1305° C. in an electric furnace at a rate of 200° C./hour, and was rapidly cooled within the furnace. The cordierite reaction ratio R of the pellets were measured in the same manner as in Example 1. More specifically, 15 mm$\times$20 mm pressed surfaces of the pellets were irradiated with x-rays such that the x-rays ar perpendicular to the pressed surfaces. Diffraction peak intensities Ip(310) and Ic(100) at $2\theta = 30.8°$ and $2\theta = 10.3°$ were measured on the (310) face of the protoenstatite crystals and on the (100) face of the cordierite crystals, respectively. Based on the measurements, the cordierite reaction ratio $R = Ip(310)/Ic(100)$ was calculated for each fired pellet. The calculated ratios R of the pellets in this Example 4 are indicated in Table 7, together with the ratios R of the specimens of Example 1.

TABLE 7

| Specimen Nos. | 1 | 2 | 3 | 4 | 5 |
|---|---|---|---|---|---|
| Reaction Ratio R |  |  |  |  |  |
| Example 4 | 0.19 | 0.17 | 0.21 | 0.42 | 0.44 |
| Example 1 | 0.16 | 0.14 | 0.18 | 0.45 | 0.49 |
| Thermal Expansion Coefficient of Example 1 ($\times 10^{-6}$/°C., 40–800° C.) | 0.70 | 0.69 | 0.78 | 1.33 | 1.47 |

EXAMPLE 5

By using the processed reclaimed cordierite compositions, Specimen Nos. 3 and 4 of Example 1, unfired honeycomb structures were formed by extrusion in the same manner as in Example 1. Each honeycomb structure has dimensions of $20 \times 30 \times 40$ mm (40 mm high), a wall thickness of 150 microns, and about 62 cells per square centimeter (the cells being open in the $20 \times 30$ mm plane). The formed honeycomb structures were then fired in an electric furnace, at a temperature rise rate of 200° C./hour, up to different temperatures between 1240° C. and 1340° C. Thus, various heat-treated honeycomb samples were prepared.

The surfaces of the wall ($30 \times 40$ mm surfaces) were irradiated with x-rays for measuring peak heights values Ip(310) and Ic(100) of the (310) and (100) faces of the protoenstatite and cordierite crystals. The measured x-ray diffraction peak heights are shown in relation to the firing temperature, in FIG. 2.

It appears from FIG. 2 that evaluation of the cordierite reaction ratio R is possible within a firing temperature range of 1280°–1330° C. (temperature at which the specimens were removed out of the electric furnace). For improved reliability of the obtained data, it is desir-

TABLE 6

| Specimen Nos. Processed Reclaimed Material | Comparative — | 16 No. 1 | 17 No. 1 | 18 No. 1 | 19 No. 1 | 1 No. 1 | 20 No. 4 | 21 No. 4 | 22 No. 4 | 23 No. 4 | 4 No. 4 |
|---|---|---|---|---|---|---|---|---|---|---|---|
| Propor-   Fresh Material | 100 | 90 | 70 | 50 | 20 | 0 | 99 | 98 | 95 | 90 | 0 |
| tion       Reclaimed Material | 0 | 10 | 30 | 50 | 80 | 100 | 1 | 2 | 5 | 10 | 100 |
| Reaction Ratio R | 0.12 | 0.14 | 0.15 | 0.15 | 0.16 | 0.16 | 0.20 | 0.30 | 0.36 | 0.46 | 0.45 |
| Coefficient of Thermal Expansion ($\times 10^{-6}$/°C., 40–800°C.; 1400° C. $\times$ 8 hours) | 0.56 | 0.64 | 0.64 | 0.67 | 0.67 | 0.70 | 0.81 | 0.95 | 1.15 | 1.30 | 1.33 | able that the specimen samples whose ratio R are obtained be fired to a temperature between 1300° C. and 1310° C.

EXAMPLE 6

Cordierite materials having chemical compositions as shown in Table 8 were mixed together in proportions as indicated in Table 9, whereby batch compositions A through E were prepared. To 100 parts by weight of each of these prepared batch compositions A-E, were added 3 parts by weight of methylcellulose as an organic binder, and a suitable amount of water. Each mixture was kneaded, and then extruded into a honeycomb structure X, according to an ordinary extrusion method. Each of the extruded honeycomb structures X has a diameter of 102 mm, a height of 89 mm, and a wall thickness of 150 microns, and has about 62 cells per square centimeter. These honeycomb structures X were prepared for samples whose thermal expansion coefficients are measured, as described below. In the meantime, 20×30×40 mm honeycomb blocks Y were formed by the same extrusion method, using the batch compositions A-E. Each honeycomb block Y has a wall thickness of 150 microns and about 62 cells per square centimeter. These honeycomb blocks Y were prepared for samples whose cordierite reaction ratios R are measured as indicated below.

The unfired honeycomb structures X were then fired at 1400° C. for 8 hours, and the thermal expansion coefficients of the obtained fired samples were measured. On the other hand, the unfired honeycomb blocks Y were heated to different temperatures before they were cooled, as described later in detail. The reaction ratios R of these fired honeycomb blocks Y were measured. The measurements are listed in Table 10.

TABLE 10

| | | Batch Compositions | | | | |
|---|---|---|---|---|---|---|
| | | A | B | C | D | E |
| Reaction Ratio R | | | | | | |
| Fired to | 1280° C. | 0.21 | — | — | — | 0.52 |
| | 1300° C. | 0.14 | 0.42 | 0.44 | 0.51 | 0.46 |
| | 1305° C. | 0.12 | 0.40 | 0.43 | 0.49 | 0.46 |
| | 1310° C. | 0.11 | 0.39 | 0.42 | 0.48 | 0.45 |
| | 1330° C. | 0.07 | — | — | — | 0.34 |
| Coefficient of Thermal Expansion ($\times 10^{-6}$/°C. 40-800° C.) | | 0.56 | 1.30 | 1.42 | 1.52 | 1.47 |

The cordierite materials used for preparing the honeycomb structures X and blocks Y, except talc (c), were passed through a 105-micron shieve. The talc (c) was ground into a fine powder, and the powder was passed through a 44-micron shieve. The kaolin (b) is not desirable in the crystal structure, since the kaolinite crystals have a larger size along the C axis, and the C axis is not properly oriented perpendicularly to the pressed surfaces of the honeycomb structures or blocks during the extrusion.

The reclaimed cordierite compositions were obtained by crushing or milling dried, unfired honeycomb structures which had been formed. Different crushing or milling conditions were used for preparing the reclaimed cordierite compositions (a) through (d).

The cordierite reaction ratios R were obtained on the fired honeycomb blocks Y, which were heated in an electric furnace to different temperatures as indicated in Table 10, between 1280° C. and 1330° C. The temperature was raised at a rate of 200° C./hour. When the blocks Y were heated to the specified temperature levels, the blocks were removed out of the electric furnace,

TABLE 8

| Raw Material | | | Chemical Composition (wt. %) | | | | | | |
|---|---|---|---|---|---|---|---|---|---|
| | | | Ig. loss | SiO$_2$ | Al$_2$O$_3$ | MgO | Fe$_2$O$_3$ | TiO$_2$ | K$_2$O + Na$_2$O + CaO |
| Talc | a | Low-alkalino type | 5.6 | 61.8 | 0.2 | 31.7 | 0.1 | — | 0.3 |
| | b | High-alkalino type | 7.9 | 58.8 | 0.1 | 31.8 | 0.2 | — | 0.9 |
| | c | Fine particle type | 5.6 | 61.8 | 0.2 | 31.7 | 0.1 | — | 0.3 |
| Kaoline | a | — | 13.9 | 45.3 | 38.6 | — | 0.4 | 1.2 | 0.3 |
| | b | Defective crystal shape | 13.9 | 45.2 | 38.7 | — | 0.3 | 1.3 | 0.3 |
| Calcined Kaolin | | | 0.2 | 52.6 | 44.9 | — | 0.4 | 1.4 | 0.2 |
| Alumina — | | | 0.1 | | 99.3 | — | — | — | 0.3 |
| Reclaimed Cordierite Composition | a | Ball-mill | | | | | | | |
| | b | Low-speed pin mill*1 | 10.8 | 44.2 | 31.6 | 12.1 | 0.3 | 0.5 | 0.3 |
| | c | Low-speed pin mill*2 | | | | | | | |
| | d | High-speed pin mill | | | | | | | |

TABLE 9

| | | Batch Compositions (wt. %) | | | | |
|---|---|---|---|---|---|---|
| | | A | B | C | D | E |
| Talc | a | 39.1 | — | — | 39.1 | 19.5 |
| | b | — | 39.1 | — | — | — |
| | c | — | — | 39.1 | — | — |
| Kaolin | a | 27.2 | 27.2 | 27.2 | — | 13.6 |
| | b | — | — | — | 27.2 | — |
| Calcined Kaolin | | 20.2 | 20.2 | 20.2 | 20.2 | 10.1 |
| Alumina | | 13.5 | 13.5 | 13.5 | 13.5 | 6.8 |
| Reclaimed cordierite composition (a) | | — | — | — | — | 50.0 | and was held in air for rapid cooling. The x-ray diffraction peak heights Ip(310) and Ic(100) were measured in the same manner as in Example 1, to calculate the reaction ratio $R = Ip(310)/Ic(100)$.

As is apparent from Table 10, the cordierite reaction ratios R of the honeycomb blocks Y are substantially proportional to the thermal expansion coefficients of the honeycomb structures X. The thermal expansion coefficient exceeds $1.0 \times 10^{-6}$/°C. where the reaction ratio R exceeds 0.3. The firing temperature of 1305° C. is preferably used as a reference temperature at which the evaluation of the thermal expansion coefficient may be achieved comparatively accurately, depending upon whether the reaction ratio is above or below the reference value of 0.3.

Referring to FIG. 3, there are shown relations between, the x-ray diffraction peak heights Ip(310) and Ic(100) of the honeycomb blocks Y, and the firing temperatures (between 1200° C. and 1330° C.). Marks "○" and "△" indicate the honeycomb block samples Y which have satisfactorily low cordierite reaction ratios R (which cause accordingly low thermal expansion coefficient of the honeycomb structures X), while marks "●" and "▲" indicate the honeycomb block samples Y which have excessively high cordierite reaction ratios R (which permit excessively high thermal expansion coefficient). In the honeycomb block samples Y having excessively high reaction ratios, a solid-phase crystallization of the cordierite starts at a relatively low temperature, and therefore the liquid-phase crystallization is restrained by a solid-phase crystallization at such a low temperature, whereby the liquid-phase crystallization temperature is raised, causing an unbalanced state between an amount of the crystallized protoenstatite (intermediate product) and an amount of the crystalized cordierite.

EXAMPLE 7

The materials indicated in Table 8 were mixed together in the proportions indicated in Table 11, to prepare various batch compositions A-1 through A-3, E-1 through E-3, and F through I. By using these batch compositions, honeycomb structures X and honeycomb blocks Y were formed and fired in the same manner as in Example 6. The thermal expansion coefficients of the honeycomb structures X, and the cordierite reaction ratios R of the honeycomb blocks Y were measured, as in Example 6. The measurements were listed in Table 12.

The honeycomb blocks Y whose reaction ratios R was measured, were fired to 1305° C. in an electric furnace, at different temperature rise rates.

TABLE 11

|  | Cordierite Batch Compositions (wt. %) | | | | | | |
|---|---|---|---|---|---|---|---|
|  | A<br>A-1<br>A-2 A-3 | E<br>E-1<br>E-2 E-3 | F | G | H | I |
| Talc (a) | 39.1 | 19.5 | — | | 19.5 | |
| Kaolin (a) | 27.2 | 13.6 | — | | 13.6 | |
| Calcined kaolin | 20.2 | 10.1 | — | | 10.1 | |
| Alumina | 13.5 | 6.8 | — | | 6.8 | |
| Reclaimed material | — | (a)<br>50.0 | (b)<br>50.0 | (b)<br>100.0 | (c)<br>50.0 | (d)<br>50.0 |

TABLE 12

|  | Cordierite Batch Compositions | | | | | | | | |
|---|---|---|---|---|---|---|---|---|---|
|  | A | | | E | | | | | |
|  | A-1 | A-2 | A-3 | E-1 | E-2 | E-3 | F | G | H | I |
| Electric-Furnace Heating Rate (°C./Hr) | 150 | 300 | 350 | 150 | 300 | 350 | 300 | 300 | 300 | 300 |
| Reaction Ratio R (1305° C.) | 0.09 | 0.11 | 0.15 | 0.43 | 0.47 | 0.49 | 0.18 | 0.23 | 0.30 | 0.34 |
| Coefficient of Thermal Expansion ($\times 10^{-6}$/°C.) | | 0.56 | | | 1.47 | | 0.72 | 0.81 | 1.00 | 1.14 |

EXAMPLE 8

A 15 mm×20 mm plate was press-molded under 300 kg/cm², by using a 5 g homogeneous powder mass of each of the cordierite compositions A through I used in Examples 6 and 7. Each formed plate was fired in an electric furnace to 1305° C. at a rate of 300° C./hour, and was cooled in air outside the furnace. The cordierite reaction ratios R of the fired plates were obtained as in Example 6. In measuring the x-ray diffraction peak heights Ip(310) and Ic(100) of the (310) and (100) faces of the protoenstatite and cordierite crystals, x-rays were incident upon the 15 mm×20 mm pressed surface of the fired plates, such that the direction of irradiation of the x-rays was to the pressed surface which is perpendicular to the direction in which a pressure is applied during the pressure molding. Based on these peak heights, the cordierite reaction ratios R were calculated.

The calculated values of the ratios R are shown in Table 13, together with the thermal expansion coefficients of the honeycomb structures X of Examples 6 and 7 (fired at 1400° C. for 8 hours).

Figure 4:
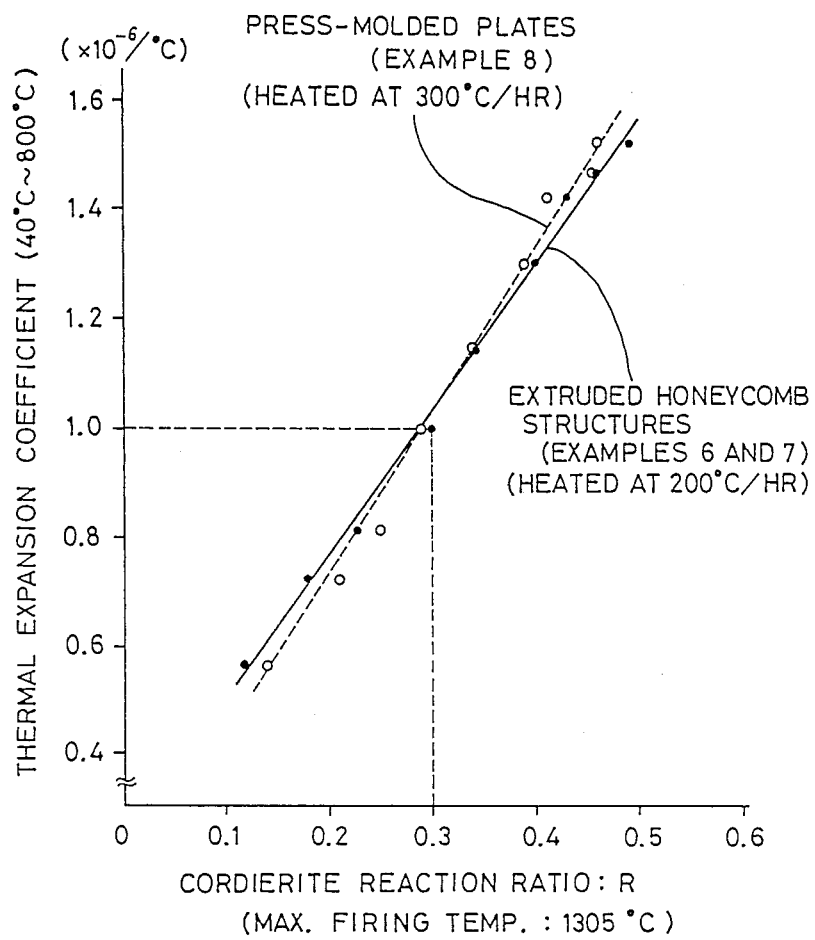
FIG. 4 is a graphical representation associated with Examples 6–8, showing a relation similar to that of FIG. 1.

The cordierite reaction ratios R and the thermal expansion coefficients of Table 13 are indicated by dots in FIG. 4. As is understood from the figure, the thermal expansion coefficient of the pressed-molded plates and the extruded honeycomb structures X (fired under ordinary conditions, i.e., 1400° C. for 8 hours) is substantially linearly proportional to the cordierite reaction ratio R of the plates. The graph shows that the thermal expansion coefficient is below $1.0 \times 10^{-6}$/°C. (at 40°–800° C.) where the cordierite reaction ratio at 1305° C. is 0.3 or lower.

TABLE 13

| Cordierite Batch Compositions | Reaction Ratio R (1305° C.) | Coefficient of Thermal Expansion ($\times 10^{-6}$/°C. 40–800° C.) (1400° C. × 8 hr) |
|---|---|---|
| A | 0.14 | 0.56 |
| B | 0.39 | 1.30 |
| C | 0.41 | 1.42 |
| D | 0.46 | 1.52 |
| E | 0.46 | 1.47 |
| F | 0.21 | 0.72 |
| G | 0.25 | 0.81 |
| H | 0.29 | 1.00 |
| I | 0.34 | 1.14 |

According to the concept of the present invention, the thermal expansion coefficient of a fired cordierite ceramic body or product can be estimated such that the coefficient is lower than $1.0 \times 10^{-6}$/°C. (40°–800° C.) if the cordierite reaction ratio R of a sample formed of the cordierite composition of the desired cordierite ceramic body is below a value $0.30 - 0.002 \times (T - 1305)$, where T represents a temperature between 1280° C. and 1330° C., to which the sample was heated for firing. For example, if the sample is heated to the final firing temperature of 1280° C., the thermal expansion coefficient of the cordierite ceramic body fired at 1400° C. for 8 hours is estimated to be lower than $1.0 \times 10^{-6}/°$ C. where the cordierite reaction ratio R of the sample is below 0.35.

If the firing temperature of the sample was lower than 1280° C., the amount of crystallization of the cordierite may be largely fluctuated. On the other hand, if the firing temperature is higher than 1330° C., the amount of the protoenstatite tends to be reduced, causing a relatively large variation in the cordierite reaction ratio R to be obtained. It is preferred that the sample is heated up to a temperature between 1300° C. and 1310° C., and is rapidly cooled immediately after the sample has been heated to that temperature. Normally, the sample is cooled at a rate of 300° C./hour or higher, preferably 500° C./hour or higher.

For improved accuracy of the reaction ratio R, the sample is heated preferably at a rate of about 150°–350²⁰ C./hour, and more preferably at a rate between 200° C./hour and 300° C./hour.

As discussed above, the sample whose cordierite reaction ratio R is checked is fired by heating to a temperature (1280° C.–1330° C.) which is lower than a temperature (around 1400° C.) at which the desired cordierite ceramic body or product is usually fired. Therefore, the cordierite reaction ratio R of the sample can be obtained in a comparatively short length of time.

What is claimed is:

1. A process for producing a cordierite ceramic body, by using a reclaimed cordierite composition from a cordierite ceramic article, said reclaimed cordierite composition being substantially the same as the composition of said cordierite ceramic body, said reclaimed cordierite composition being recovered in the form of a dried, unfired scrap which is rejected during production of said cordierite ceramic article, said process comprising the steps of:

forming a desired formed body under a pressure, by using a starting material which consists of said recovered reclaimed cordierite composition, or a mixture of said reclaimed cordierite composition and a fresh cordierite composition having substantially the same composition as that of said cordierite ceramic body;

firing said formed body at a temperature between 1300° C. and 1310° C. to result in a fired sample of said cordierite ceramic body;

measuring a reaction ratio R of said fired sample, said reaction ratio R being, $$R = Ip(310)/Ic(100),$$

wherein Ip(310) and Ic(100) respectively represent peak intensities in an x-ray diffraction analysis of a (310) face of a protoenstatite crystal and a (100) face of a cordierite crystal on a pressure surface of said fired sample;

formulating said starting material in a manner which minimizes milling impacts, such that the reaction ratio R formed from a fired sample thereof is not greater than 0.3; and starting a batch production of said cordierite ceramic body by using the formulated starting material.

2. A process according to claim 1, wherein said step of forming a desired formed body comprises forming a honeycomb structure.

3. A process according to claim 1, wherein said cordierite ceramic body has a thermal expansion coefficient of $1.0 \times 10^{-6}/°$C. or less.

4. A process according to claim 1, wherein said dried, unfired scrap consists of a portion of a batch of the cordierite composition not used for producing said cordierite ceramic article.

5. A process according to claim 1, wherein said dried, unfired scrap consists of a dried, unfired shaped body or fragments thereof rejected before said shaped body is fired into said cordierite ceramic article.

6. A process according to claim 1, wherein said step of formulating said starting material comprises crushing said dried, unfired scrap into small pieces with a toothed roll crusher.

7. A process according to claim 6, further comprising milling said small pieces into finely divided particles using a low-speed pin mill.

8. A process according to claim 1, further comprising a step of adding water to said dried, unfired scrap or to a mass of fragments thereof, and thereby forming a slurry or green batch of said reclaimed cordierite composition.

9. A process according to claim 1, wherein said reaction ratio R of said reclaimed cordierite composition represented by said equation is 0.3 or less.

10. A process according to claim 1, wherein said starting material contains said reclaimed cordierite composition in an amount of 2.5–100% by weight.

11. A process according to claim 1, wherein said step of firing said desired formed body into a fired sample of said cordierite ceramic body comprises heating said formed body at a rate of about 150° C.–350° C./hour, and rapidly cooling said formed body immediately after said formed body is heated up to a temperature between 1300° C. and 1310° C., said process further comprising a step of subjecting the thus obtained sample to an x-ray diffraction analysis to obtain said peak intensities Ip(310) and Ic(100) for calculating said reaction ratio R.

12. A cordierite ceramic body formed by using starting materials of a cordierite composition which consist of a reclaimed cordierite composition of a cordierite ceramic article having a composition being substantially the same as the composition of said cordierite ceramic body, or a mixture of said reclaimed cordierite composition and a fresh cordierite composition having a composition which is substantially the same as the composition of said cordierite ceramic body, said reclaimed cordierite composition being recovered in the form of a dried, untired scrap rejected during production of a cordierite ceramic article, wherein the cordierite composition of said starting materials is used to provide a formed fired body which is formed under a pressure and fired at a temperature between 1300° C. and 1310° C., said fired body having a cordierite reaction ratio R which is not greater than 0.3, said reaction ratio R being $$R = Ip(310)/Ic(100),$$

where, Ip(310) and Ic(100) respectively represent peak intensities in an x-ray diffraction analysis of a (310) face of a protoenstatite crystal and a (100) face of a cordierite crystal on a pressure surface of said fired body.

13. A cordierite ceramic body according to claim 12, wherein said step of forming a desired formed body comprises forming a honeycomb structure.

14. A cordierite ceramic body according to claim 12, wherein said cordierite ceramic body has a thermal expansion coefficient of $1.0 \times 10^{-6}/°$C. or less.

15. A cordierite ceramic body according to claim 12, wherein said starting material contains said reclaimed cordierite composition in an amount of 2.5-100% by weight.

16. A cordierite ceramic body according to claim 12, wherein said reaction ratio R of said reclaimed cordierite composition represented by said equation is 0.3 or less.

17. A cordierite starting material composition for forming a cordierite ceramic body by firing thereof, said cordierite starting material composition comprising reclaimed cordierite or a mixture of reclaimed cordierite and a fresh cordierite composition, said cordierite starting material composition having a particle size of not greater than 150 microns, said starting material composition being used to provide a formed fired body which is formed under a pressure and fired at a temperature between 1300° C. and 1310° C., said fired body having a cordierite reaction ratio R which is not greater than 0.3, said reaction ratio R being $R = Ip(310)/Ic(100)$, where, Ip(310) and Ic(100) respectively represent peak intensities in an x-ray diffraction analysis of a (310) face of protoenstatite crystal and a (100) face of a cordierite crystal on a pressure surface of said fired body.

18. A cordierite starting material composition according to claim 17, wherein said cordierite ceramic body is a honeycomb structure.

19. A cordierite starting material composition according to claim 18, wherein said cordierite ceramic body has a thermal expansion coefficient of $1.0 \times 10^{-6}/°C$. or less.

20. A method of evaluating a quality of starting materials of a cordierite composition for producing a cordierite ceramic body by firing said cordierite composition, comprising the steps of:
preparing a sample of said cordierite ceramic body, by forming under a pressure an unfired formed body of said cordierite composition, and firing said unfired formed body at a temperature between 1280° C. and 1330° C.;
subjecting said sample to an x-ray diffraction analysis, to obtain a peak intensity IP(310) of a (310) face of a protoenstatite crystal and a peak intensity Ic(100) of a (100) face of a cordierite crystal, on a pressure surface of said sample, respectively; and
estimating a thermal expansion coefficient of said sample, depending upon a reaction ratio R of said cordierite composition, said ratio being [represented by an equation] $R = Ip(310)/Ic(100)$, and thereby evaluating the quality of said cordierite composition for said cordierite ceramic body to be produced.

21. A method according to claim 20, wherein said step of preparing a sample of said cordierite ceramic body comprises heating said unfired formed body at a rate of about 150° C.-350° C./hour, and rapidly cooling said formed body immediately after said formed body is heated up to said temperature between 1280° C. and 1330° C., whereby said sample is formed.

22. A method according to claim 21, wherein said unfired formed body is heated to a temperature between 1300° C. and 1310° C.

23. A method according to claim 20, wherein said sample of said cordierite ceramic body consists of a honeycomb structure having walls which has said pressure surface to be subjected to said x-ray diffraction analysis.

24. A method according to claim 20, wherein said sample of said cordierite ceramic body consists of a pressed-formed article having said pressure surface to be subjected to said x-ray diffraction analysis.

25. A method according to claim 20, wherein said step of estimating a thermal expansion coefficient of said sample and evaluating the quality of said cordierite composition comprises determining that the thermal expansion coefficient of said cordierite ceramic body is $1.0 \times 10^{-6}/°C$. or less, if said reaction ratio R is equal to or less than a value, where T represents a temperature between 1280° C. and 1330° C., to which said unfired formed body is heated to provide said sample.

26. A process for producing a cordierite ceramic body, by using a reclaimed cordierite composition from a cordierite ceramic article, said reclaimed cordierite composition being substantially the same as the composition of said cordierite ceramic body, said reclaimed cordierite composition being recovered in the form of a dried, unfired scrap which is rejected during production of said cordierite ceramic article, said process comprising the steps of:
forming a desired formed body under a pressure, by using a starting material which consists of said recovered reclaimed cordierite composition, or a mixture of said reclaimed cordierite composition and a fresh cordierite composition having substantially the same composition as that of said cordierite ceramic body;
firing said formed body at a temperature between 1300° C. and 1310° C. to result in a fired sample of said cordierite ceramic body;
measuring a reaction ratio R of said fired sample, said reaction ratio R being, $R = Ip(310)/Ic(100)$, wherein Ip(310) and Ic(100) respectively represent peak intensities in an x-ray diffraction analysis of a (310) face of a protoenstatite crystal and a (100) face of a cordierite crystal on a pressure surface of said fired sample;
formulating said starting material by crushing, with a toothed roll crusher, said dried, unfired scrap into small pieces having a size of not greater than about 50 mm and then milling said small pieces using a low-speed pin mill, such that the reaction ratio R formed from a fired sample thereof is not greater than 0.3; and
starting a batch production of said cordierite ceramic body by using the formulated starting material.

* * * * *